United States Patent [19]

Herzl

[11] 4,262,544
[45] Apr. 21, 1981

[54] TORQUE-TRANSDUCER FOR VORTEX-SHEDDING FLOWMETER HAVING TORSIONAL SENSOR

[75] Inventor: Peter J. Herzl, Morrisville, Pa.

[73] Assignee: Fischer & Porter Co., Warminster, Pa.

[21] Appl. No.: 37,532

[22] Filed: May 10, 1979

Related U.S. Application Data

[63] Continuation-in-part of Ser. No. 13,557, Feb. 21, 1979, which is a continuation-in-part of Ser. No. 944,624, Sep. 21, 1978, Pat. No. 4,181,020.

[51] Int. Cl.³ .................................................. G01F 1/32
[52] U.S. Cl. ................................. 73/861.24; 310/338; 73/650; 73/DIG. 4
[58] Field of Search ............ 73/194 VS, DIG. 4, 650, 73/661; 310/321, 328, 338

[56] References Cited

U.S. PATENT DOCUMENTS

| | | | |
|---|---|---|---|
| 2,054,787 | 9/1936 | Beavers | 73/DIG. 4 |
| 3,116,639 | 1/1964 | Bird | 73/194 |
| 3,269,175 | 8/1966 | Sprosty | 73/DIG. 4 |
| 3,782,184 | 1/1974 | Shuck | 73/650 |
| 4,122,712 | 10/1978 | Thomas, Jr. | 73/194 X |

*Primary Examiner*—Herbert Goldstein
*Attorney, Agent, or Firm*—Michael Ebert

[57] ABSTRACT

A vortex-shedding flowmeter in which a liquid or gas to be metered is conducted through a flow tube having a shedding body transversely supported thereon. Torsionally-supported at a downstream position behind the shedder on a shaft which projects outside of the flow tube to provide a shaft extension is a sensor, the pivot axis of the shaft being normal to the longitudinal axis of the tube. In operation, as the incoming fluid stream is divided by and flows past the shedder, vortices are successively detached therefrom and appear alternately on either side of the sensor, thereby developing a torque about the pivot axis. The torques are developed alternately in the clockwise and counterclockwise directions, causing the torsionally-supported sensor to oscillate at a rate proportional to the flow rate of the fluid. These oscillations are converted by a transducer operatively coupled to the sensor into a corresponding electrical signal. The transducer is constituted by two pairs of piezoelectric elements which engage the shaft extension on opposite sides thereof and are preloaded.

11 Claims, 9 Drawing Figures

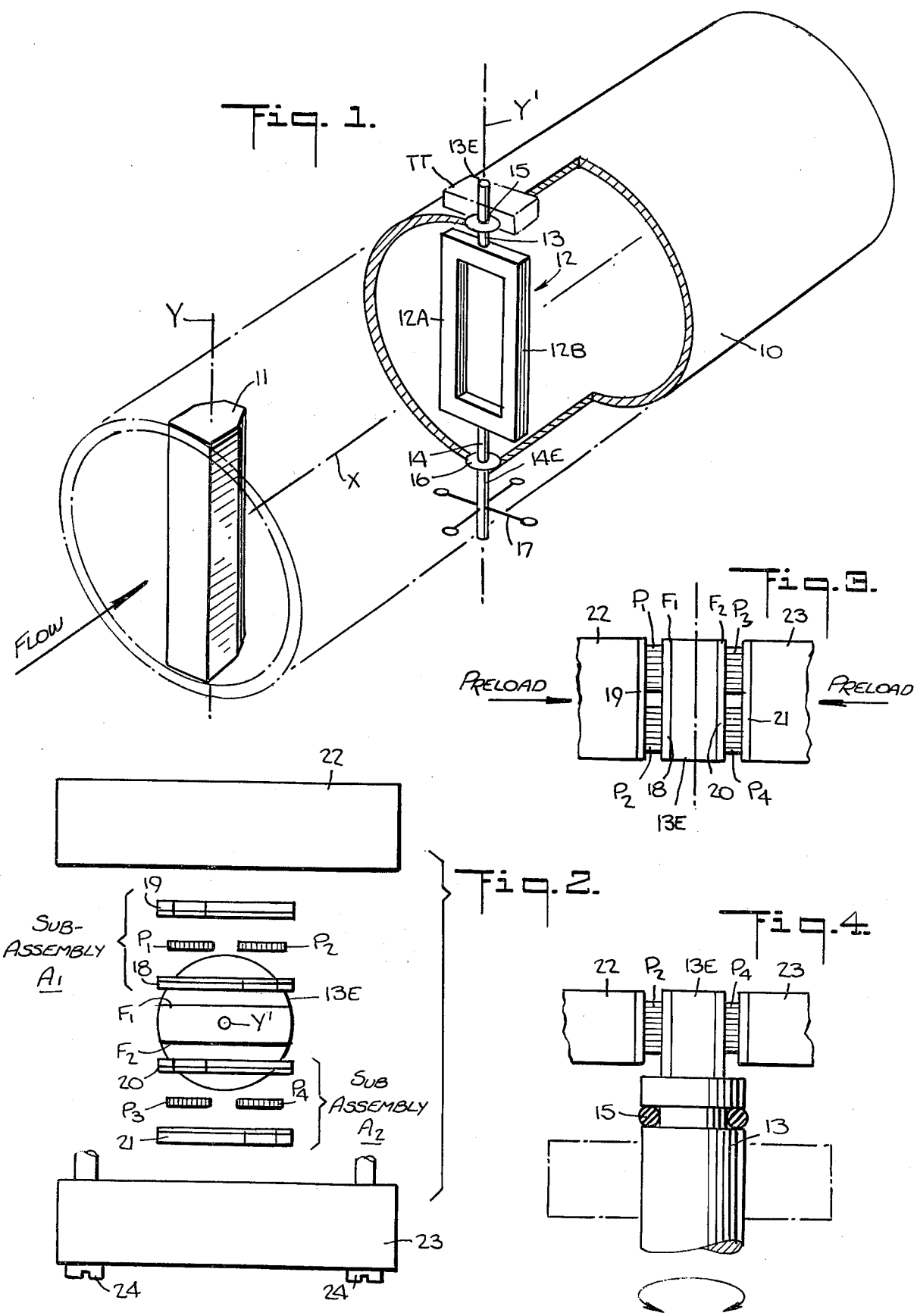

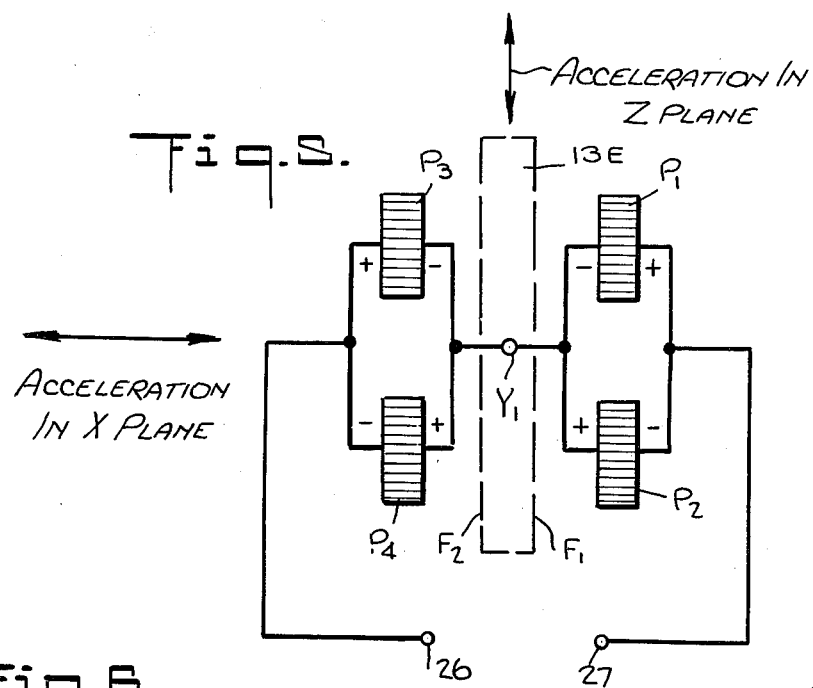
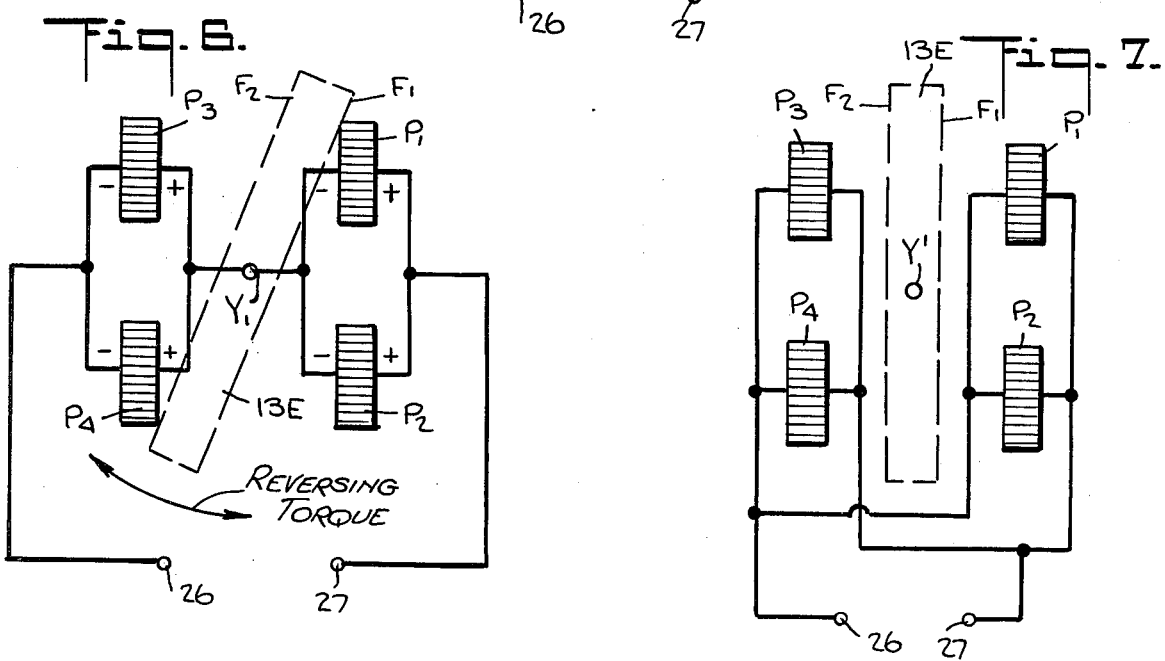
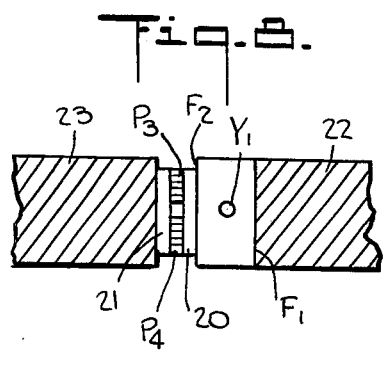
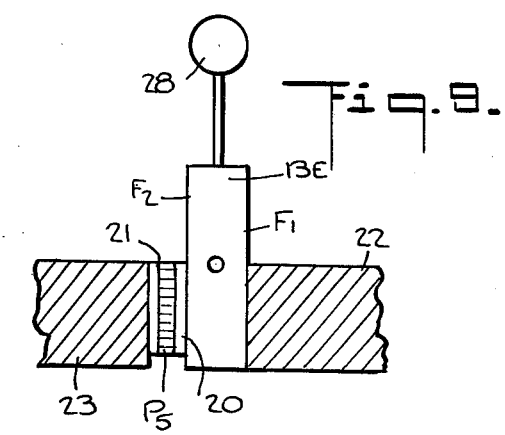

TORQUE-TRANSDUCER FOR VORTEX-SHEDDING FLOWMETER HAVING TORSIONAL SENSOR

RELATED APPLICATION

This application is a continuation-in-part of my copending application Ser. No. 013,557, filed Feb. 21, 1979, entitled "Vortex Shedding Flowmeter Having Drag-Actuated Torsional Sensor," which in turn is a continuation-in-part of my copending application Ser. No. 944,624, filed Sept. 21, 1978, entitled "Vortex-Shedding Meter Having a Sensing Vane" now U.S. Pat. No. 4,181,020.

BACKGROUND OF THE INVENTION

This invention relates generally to vortex-shedding flowmeters, and more particularly to a flowmeter of this type which includes a torsionally mounted sensor and a balanced piezoelectric torque transducer associated therewith to provide an output signal whose frequency is proportional to the flow rate of the fluid being metered whereby the meter is useful for both liquid and gas flow rate measurement.

It is well known that under certain circumstances the presence of an obstacle or shedder in a flow conduit will give rise to a periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate.

It is this phenomenon which is exploited to create a flowmeter to measure the volumetric flow of fluids being treated or supplied in order to carry out various control functions. Flowmeters of this type are disclosed in Bird U.S. Pat. No. 3,116,639, and in White U.S. Pat. No. 3,650,152. Existing flowmeters of the vortex shedding type, such as those disclosed in the Burgess U.S. Pat. No. 3,888,120 and the Herzl U.S. Pat. No. 4,162,238, are capable of effecting volumetric or mass flow measurement.

In my first copending patent application Ser. No. 944,624, filed Sept. 21, 1978, entitled "Vortex-Shedding Flowmeter Having a Sensing Vane," the entire disclosure of which is incorporated herein by reference, there is disclosed a vortex-type flowmeter in which fluidic oscillations produced by a shedder are sensed by a downstream balanced-vane sensor pivoted in a torsional suspension that allows only microscopic vane motion. The shedder mounted in the flow tube acts to divide the incoming fluid flowing therethrough and causes vortices to be shed alternately on either side thereof. The downstream train of vortices passing on either side of the vane sensor generates fluidic forces giving rise to alternate clockwise and counterclockwise torques, causing the sensor to oscillate mechanically at a frequency proportional to the flow rate of the fluid being metered.

My second copending patent application Ser. No. 013,557, filed Feb. 21, 1979, entitled "Vortex Shedding Flowmeter Having Drag-Actuated Torsional Sensor," is a continuation-in-part of the above-identified first application Ser. No. 944,624, the present application being a continuation-in-part of the Second application. In the second application, whose entire disclosure is incorporated herein by reference, torsionally-supported behind the shedder is a drag-actuated sensor which includes a pair of parallel legs symmetrically disposed with respect to the longitudinal axis of the flow tube.

With a drag-actuated sensor of this type, a vortices are successively detached from the shedder and appear alternately on either side of the gap between the shedder and the downstream sensor, the low pressure region generated by each vortex acts to displace the stagnant zone produced in this gap as a result of fluid flow past the shedder to a position in front of the adjacent leg of the sensor, the fluid flow then going around and past the other leg, thereby developing a torque about the pivot axis. These torques are developed alternately, causing the torsionally-supported sensor to oscillate at a frequency in accordance with flow rate.

In both the first and second patent applications, the oscillatory motion of the torsionally-supported sensor is detected by means of a transducer which takes the form of a strain gauge bonded to a resilient beam, one end of which is attached to the trunnion or shaft of the sensor projecting through the flow tube, the other end being anchored. The resultant deformation of the beam as the shaft oscillates is translated by the strain gauge into a corresponding electrical signal whose frequency is indicative of flow rate. These patent applications also note that in lieu of a strain gauge, one may detect the deformation of the resilient beam by a piezoelectric element of other forms of micro-motion detectors.

As pointed out in the first and second patent applications, an important advantage of a vortex flowmeter having a torsionally-mounted sensor is that the meter is effective and accurate for both liquid and gas flow measurements.

Though the vortex-type flowmeters disclosed in the first and second patent applications represent a significant advance over prior art vortex-type meters, such as those disclosed in the above-identified patents, their torque transducer arrangements have certain drawbacks and therefore fall short of an ideal arrangement.

Inasmuch as the torque transducer arrangement disclosed in the present application closely approaches the ideal requirements for a sensing system constituted by a torque transducer associated with a torsionally-mounted sensor in a vortex-type flowmeter, these ideals will now be set forth:

A. The system has a sensitivity which renders the meter effective for low-pressure gas measurement.

B. The system is one which has an inherent ruggedness that renders the meter suitable for heavy-duty liquid flow rate measurement.

C. The system is insensitive to mechanical vibration and shock and acceleration forces to which the flowmeter is subjected.

D. The system is capable of operating over the broad temperature range encountered in gas and liquid measurement and is capable of operating over a very wide operating frequency range.

E. The sensing system requires virtually no motion and is not limited by torque transducer bonding or attachment problems.

F. Finally, the sensing system is one which is relatively inexpensive and has a compact structure.

SUMMARY OF THE INVENTION

In view of the foregoing, the main object of this invention is to provide a torque transducer operable in conjunction with a torsionally-mounted sensor in a vortex-type flowmeter to create a sensing system whose characteristics closely approach the previously-listed ideal requirement for a system of this type.

More particularly, an object of this invention is to provide a piezoelectric torque transducer constituted by at least one piezoelectric element which is held between the shaft extension of the torsionally-mounted sensor projecting outside of the flow tube and a stationary pre-loading block whereby oscillation of the shaft-extension alternately subjects the element to compression and released-compression or decompression to generate an alternating voltage whose frequency is proportional to the flow rate of the fluid being metered.

Also an object of the invention is to provide a balanced-piezoelectric torque transducer constituted by two pairs of pre-loaded crystal elements on opposite sides of the shaft extension, which elements are so connected as to render the transducer insensitive to acceleration and other forces otherwise giving rise to spurious signals.

Briefly stated, in a preferred embodiment of a transducer assembly in accordance with the invention, the transducer cooperates with an extension of the shaft on which the torsionally-mounted sensor of the vortex meter is pivoted, the shaft extension having two flat parallel faces on opposing sides thereof.

The transducer assembly is constituted by a first pair of parallel-connected piezoelectric elements lying in a common plane and interposed between one face of the shaft extension and a first pre-loading block, and a second pair of parallel-connected piezoelectric elements lying in a common plane and interposed between the opposite face of the shaft extension and a second-preloading block, the movement of the extension being restricted by the pre-loaded elements to a degree whereby the extension is virtually motionless.

The two pairs of parallel-connected elements are connected to output terminals and are so polarized in relation to the faces of the shaft extension that alternate clockwise and counterclockwise torques cause the interconnected elements to generate an alternating voltage of the same frequency.

OUTLINE OF DRAWINGS

For a better understanding of the invention as well as other objects and further features thereof, reference is made to the following detailed description to be read in conjunction with the accompanying drwings, wherein:

FIG. 1 is a schematic view, in perspective, of a vortex flowmeter which includes a sensing system constituted by a torsionally-mounted sensor and a torque transducer in accordance with one preferred embodiment of the invention;

FIG. 2 is an exploded view of the first embodiment of the torque transducer;

FIG. 3 is a plan view of the first embodiment of the torque transducer;

FIG. 4 is a side view of the first embodiment;

FIG. 5 is a schematic circuit diagram of the first embodiment of the transducer in a series arrangement of the piezoelectric elements;

FIG. 6 shows the stress relationship between the shaft extension and the piezoelectric elements of the transducer;

FIG. 7 is the schematic circuit diagram of the first embodiment in a parallel arrangement of the piezoelectric elements;

FIG. 8 is a plan view of a second embodiment of a torque transducer in accordance with the invention; and FIG. 9 is a plan view of a third embodiment of the torque transducer.

DESCRIPTION OF INVENTION

Meter Structure and Operation

Referring now to FIG. 1, there is shown a flowmeter of the vortex-shedding type which includes a sensing system having a torque transducer in accordance with the invention. The meter is provided with a flow tube 10 which, in practice, is interposed in the line carrying a liquid or gas whose flow is to be metered. Though the torsionally-mounted sensor included in this meter is of the type disclosed in the above-identified second pending application, it is to be understood that the invention is also applicable to the sensor included in the above-identified first patent application or any other torsionally-mounted sensor in a vortex-type meter.

Mounted transversely within flow tube 10 (shown as having a circular cross-section) is a bluff body or shedder 11 having a generally square cross-section, the rear corners of the block being bevelled. The long axis Y of the shedder is perpendicular to the longitudinal flow axis X of the tube. The incoming flow stream which impinges on shedder 11 is divided thereby, producing fluidic perturbations in the form of Karman vortex street. The shedder may be in any known form and may, for example have geometries of the types disclosed in the above-identified prior art patents.

Mounted transversely at a downstream position in tube 10 behind the shedder is a drag-actuated torsional sensor 12 having the configuration of a rectangular frame provided with a pair of parallel legs 12A and 12B. Sensor 12 is pivotally supported by shafts or trunnions 13 and 14 which are attached to the frame at the exact center thereof along a pivot axis Y' parallel to axis Y and perpendicular to flow axis X. The sensor is statically and dynamically balanced with respect to pivot axis Y', legs 12A and 12B being symmetrical relative to this axis.

Trunnions 13 and 14 on which the sensor is pivotally supported project through the wall of flow tube 10 to provide shaft extensions 13E and 14E which are sealed with "O" rings 15 and 16 of elastomeric material, such as neoprene. The support for extension 14E is constituted by a torsional suspension formed by wires 17 of resilient metal, such as piano wire, which extend between the extension and fixed anchors. The torsional suspension for extension 14E may, in practice, be effected by other means, such as a hollow metal tube of flexible material.

The torsional suspension for shaft extension 13E is constituted by a balanced piezoelectric torque transducer shown in block form and generally designated by letter TT, the transducer detecting the microscopic vibratory motion of sensor 12. Thus as the sensor oscillates about its pivot axis Y' in accordance with the fluidic oscillations, a signal having the same frequency is generated which is indicative of flow rate. The torsional suspension for the sensor limits pivot motion at maximum torque to a microscopic motion in the order of a half micron at the "O" ring position; hence the sensor is virtually motionless in operation.

In operation, the incoming fluid to be metered is divided by shedder 11 into two streams passing by the opposing edges of the shedder to produce vortices alternately on one side and then on the other side of the gap between shedder 11 and sensor 12 at a repetition rate proportional to the flow rate.

As a result of this shedding action, a moving train of vortices travels down the right side, and a moving train of vortices travels down the left side of flow tube 10. As the fluid streams flow past shedder 11, a stagnant zone is developed in the gap behind the shedder, which zone is initially aligned with the flow tube axis X.

When a single vortex appears on the right side of the flow tube adjacent the gap, this vortex creates a low pressure region that acts to displace the stagnant zone from tube axis X and to draw it in the direction of the low pressure region to a stable position in front of leg 12B of the rear sensor. As a consequence of such stagnant zone displacement, the incoming fluid is caused to flow around and past the other leg 12A and through the open passage between the legs. This action creates a drag on leg 12A and produces a torque about pivot axis Y' in the clockwise direction.

The situation is reversed, for the succeeding vortex which appears on the left side of flow tube 10 adjacent the gap to develop a low pressure region which pulls the stagnant zone to a stable position in front of leg 12A. In this case, the incoming fluid is caused to flow around and past leg 12B and through the open passage between the legs to create a drag on leg 12B, producing a torque about pivot axis Y' in the counterclockwise direction. Thus the torsionally-mounted rear sensor is caused to oscillate about pivot axis Y' at a rate in accordance with the flow rate of the fluid being metered.

The sensor arrangement is inherently well balanced; for the structure thereof is essentially symmetrical with respect to its central pivot axis Y'. While a balanced sensor has obvious functional and structural advantages, it is particularly useful in gas metering; for the gas densities are much lower than liquid densities, resulting in much smaller vortex forces. And because the balanced sensor is pivoted in a torsional suspension that allows only microscopic motion, all motion being absorbed in the flexing component of the suspension, sticking problems are obviated.

Torque Transducer Structure (First Embodiment)

As shown in FIGS. 2, 3, and 4, the first embodiment of torque transducer TT cooperates with the extension 13E of the sensor shaft 13, this round extension being machined to present two flat parallel faces $F_1$ and $F_2$. Extension 13E oscillates about pivot axis Y'.

Coupled to face $F_1$ is a first pair of piezoelectric elements $P_1$ and $P_2$ which lie in side-by-side relation in a common plane, these elements being sandwiched between a pair of insulating plates 18 and 19 which, in practice, may be fabricated of high strength ceramic material. The inner faces of plates 18 and 19 in contact with the opposing surfaces of elements $P_1$ and $P_2$ are metallized to define electrodes for these elements. This sandwich of piezoelectric elements $P_1$ and $P_2$ and plates 18 and 19 form a first sub-assembly $A_1$.

Coupled to face $F_2$ of trunnion extension 13E is a second sub-assembly $A_2$ constituted by a pair of piezoelectric elements $P_3$ and $P_4$ sandwiched by insulating plates 20 and 21 having metallized inner faces to define the electrodes for these elements.

Sub-assemblies $A_1$ and $A_2$ are clamped onto the opposing faces $F_1$ and $F_2$ of shelf extension 13E by a pair of pre-loading stationary blocks 22 and 23 which are held together by bolts 24 and 25. The blocks serve to compress the sub-assemblies and to thereby pre-load the piezoelectric elements therein. The combination of the blocks and sub-assemblies creates a pre-loaded transducer assembly or stack whose components are cemented together and whose blocks are fixedly anchored to the flow tube.

The four piezoelectric elements $P_1$ to $P_4$ may be constituted by piezoelectric quartz crystals or other substances such as ceramics possessing piezoelectric properties. Since the entire stack is pre-loaded, the bonding or cement joints only function to exclude contaminants therefrom and are not under load. This makes possible operation at temperature levels where bonds are too weak to be subject to stress forces.

The Transducer Assembly Circuit and Its Operation

As shown in FIG. 5, crystal elements $P_1$ and $P_2$ associated with face $F_1$ of the oscillating shaft extension are arranged with their polarizations mutually reversed, these elements being connected in parallel relation to form a first network. Crystal elements $P_3$ and $P_4$ associated with face $F_2$ are in balanced relation with the first pair of elements $P_1$ and $P_2$ and are also arranged with their polarizations mutually-reversed but in opposition to the reversely-polarized first pair of elements. Elements $P_3$ and $P_4$ are connected in parallel to form a second network. The two networks are connected in series to output terminals 26 and 27.

In FIG. 5, the plus and minus signs on each of elements $P_1$ to $P_4$ indicate the polarity of the voltage generated thereby when the element is subjected to compression. Thus in compression, element $P_1$ has its negative pole adjacent face $F_1$ while element $P_2$, which has its polarization reversed with respect to element $P_1$ then has its positive pole adjacent the same face. In compression, element $P_3$ has its negative pole adjacent face $F_2$ while element $P_4$, which has its polarization reversed with respect to element $P_3$, has its positive pole adjacent the same face. It is to be understood that the polarities shown in FIG. 5 do not exist in practice for in operation one never has a situation where all four crystals are simultaneously compressed.

When compression on any one of $P_1$ to $P_4$ is released, the voltage generated thereby assumes the opposite polarity. Thus when compression on crystal $P_1$ is released, the pole adjacent face $F_1$ then becomes positive.

We shall now, in connection with FIG. 6, consider the actual behavior of the transducer when the sensor torque causes shaft extension 13E to swing in the clockwise direction, thereby subjecting elements $P_1$ and $P_4$ to compression and releasing compression on elements $P_2$ and $P_3$. As a consequence, the reversely polarized elements $P_1$ and $P_2$ in the first parallel network then have the same polarity, and reversely polarized elements $P_3$ and $P_4$ in the second network also have the same polarity. The voltages established across both networks are in additive relation because of the series connection of the networks. Hence that resultant output is twice that across either network.

If, for example, each element generates a two volt potential when subjected to compression or when compression is released, the parallel network of elements $P_1$ and $P_2$ on face $F_1$ would yield 2 volts and the parallel network of elements $P_3$ and $P_4$ on face $F_2$ would also yield 2 volts, the resultant output voltage at terminals 26–27 being 4 volts. The same 4 volt output would be produced when the shaft extension is caused to swing in the counterclockwise direction, but now the output voltage polarity would be reversed. Thus as the shaft extension oscillates at a frequency proportional to flow rate, an alternating voltage of the same frequency is yielded by the transducer at terminals 26 and 27.

Where it is desired to provide an increased current output from the transducer, the crystal elements may, as shown in FIG. 7, have the parllel network of crystals $P_1$–$P_2$ and that of crystals $P_3$–$P_4$ connected in parallel with each other, so that in the example given above, if each of the four crystals in compression and in released-compression generates 2 volts, the output voltage of the transducer is 2 volts, but the current capacity of the transducer is doubled as compared to that in FIG. 5.

Features

The balanced transducer is virtually immune to acceleration forces. In FIG. 5, the horizontal arrow represents acceleration forces in the X plane, these forces causing equal forces to be applied to crystals $P_3$ and $P_4$ or to crystals $P_1$ and $P_2$. But since crystals in each pair are oppositely polarized and are connected in parallel relation, the voltages generated thereby in response to an acceleration force are of equal magnitude and opposite polarity and therefore cancel out in the parallel network.

Similarly, an acceleration force in the Z plane indicated by the vertical arrow in FIG. 5 produces voltages of equal magnitude in elements $P_1$ and $P_3$ which are connected in series opposition and therefor cancel out. Cancellation also occurs for acceleration forces applied in the Y plane coincident with the Y' pivot axis.

The modulus of elasticity for a typical piezo-ceramic element is approximately 18,000,000 psi or about half that of steel. For piezoelectric discs having a 3/16 inch diameter and a thickness suitable for the transducer, the maximum deflection is less than 0.000001 inches, so that there is virtually no movement of the trunnion or shaft of the sensor when compressing and de-compressing the piezoelectric elements. Thus in operation the torsionally-mounted sensor 12 is almost motionless.

And since the crystal elements are very stiff, they do not contribute to mechanical resonances. The dominant resonances are those of the structure. These can be kept well above the meter operating frequency range and hence not interfere with the meter response. Since the crystals are operated in compression where they are strongest and are stressed to very low stresses, this factor affords a large margin of safety so that the risk of depoling or breaking the crystals is minimal.

Second Embodiment

In the arrangement shown in FIG. 8, the transducer assembly has a single sub-assembly of crystals $P_3$ and $P_4$ sandwiched between insulating plates 20 and 21 and interposed between pre-loading block 23 and face $F_2$ of the trunnion extension 13E. The other block 22 makes direct contact with the oppisite face $F_1$ of the trunnion extension, crystals $P_1$ and $P_2$ being omitted.

While the output of this transducer arrangement is lower than a double crystal pair transducer of the type shown in FIG. 5 and is lacking in symmetry, the cost savings are such as to make this arrangement attractive where reduced cost is a major desideratum.

Third Embodiment

In the transducer arrangement shown in FIG. 9, only a single crystal $P_5$ is sandwiched between preloading block 23 and face $F_2$ of the shaft extension 13E of the torsionally-mounted sensor, the other pre-loading block 22 being in direct contact with opposite face $F_1$.

This single crystal produces an AC output as the extension oscillates at a frequency proportional to flow rate, but this transducer is not immune to acceleration effects. In order therefore to effect mechanical compensation for acceleration effects, a counterbalancing mass 28 is secured to extensions 13E.

While there have been shown and described, preferred embodiments of a vortex shedding flowmeter having drag-actuated torsional sensor in accordance with the invention, it will be appreciated that many changes and modifications may be made therein without, however, departing from the essential spirit thereof.

I claim:
1. A vortex-shedding flowmeter for metering the flow rate of a fluid, said flowmeter comprising:
   A. a flow tube having a shedder disposed therein;
   B. a sensor torsionally supported in said flow tube at a downstream position behind the shedder on a pivot shaft which projects outside the tube to provide a shaft extension, said shaft extension having flattened sides to define opposing planar faces, an incoming fluid stream being divided by said shedder which causes vortices to appear on either side of said sensor to develop a torque about the pivot axis of said shaft, the torque bieng developed alternating in a clockwise and counterclockwise direction to cause said shaft extension to oscillate at a frequency proportinal to the flow rate of the fluid being metered; and
   C. a torque transducer operatively coupled to said extension to convert said oscillations into an electrical signal having a corresponding frequency, said transducer being constituted by two pairs of piezoelectric elements, each pair of elements being in side-by-side relation and connected in parallel with their polarities opposed, and being interposed between a respective planar face of said extension and a stationary pre-loading block subjecting said pair of elements to pre-loading compression whereby as said extension oscillates, the elements are alternately compressed and decompressed to generate an alternating voltage providing the desired signal, the movement of said extension being restricted by said pre-loaded elements to a degree whereby said extension is virtually motionless.

2. A flowmeter as set forth in claim 1, wherein said element is a crystal having piezoelectric properties.

3. A flowmeter as set forth in claim 1, wherein said element is a ceramic having piezoelectric properties.

4. A flowmeter as set forth in claim 1, wherein said elements in each of said pairs thereof are sandwiched between a pair of insulating plates whose inner faces are in contact with opposing faces of said elements and are metallized to define electrodes therefor.

5. A vortex-shedding flowmeter for accurately metering the flow rate of a liquid or gaseous fluid, said flowmeter comprising:
   A. a flow tube having a shedder transversely disposed therein to divide the incoming fluid;
   B. a sensor torsionally supported in said flow tube at a downstream position behind the shedder on a pivot shaft which projects outside the tube to provide a shaft extension whose opposing sides are flattened to define planar faces, said shedder causing vortices to appear at either side of said sensor to develop a torque about the pivot axis of the shaft, the torque being developed alternately in clockwise and counterclockwise directions whereby said extension is caused to oscillate about said axis at a frequency proportional to the flow rate of the fluid being metered; and C. a balanced torque transducer operatively coupled to said extension to convert said oscillations into an alternating voltage electrical signal having a corresponding frequency, said transducer being constituted by a pair of sub-assemblies each interposed between a stationary pre-loading block and a respective face of said extension, each sub-assembly being formed by a pair of piezoelectric elements in side-by-side relation sandwiched between a pair of insulating plates whose inner faces in contact with the opposing faces of the elements are metallized to define electrodes therefore, the movement of said extension being restricted by the pre-loaded blocks to a degree whereby said extension is virtually motionless, the elements of each pair being oppositely polarized with respect to the associated face of the extension, whereby as said extension oscillates in the clockwise and counterclockwise directions, one element in each pair is compressed by the extension while the other element thereof is decompressed in the clockwise direction of the extension and this relationship is reversed in the counterclockwise direction, said elements of both pairs being interconnected to yield said alternating-voltage signal.

6. A flowmeter as set forth in claim 5, wherein the paired elements of each sub-assembly are connected in parallel to define a network and wherein the two networks are connected in series to output terminals.

7. A flowmeter as set forth in claim 5, wherein the paired elements of each sub-assembly are connected in parllel to define a network and wherein the two networks are connected in parallel to output terminals.

8. A flowmeter as set forth in claim 5, wherein the components of each sub-assembly are cemented together to exclude contaminants thereform.

9. A flowmeter as set forth in claim 5 wherein the pre-loading blocks are bolted together.

10. A flowmeter as set forth in claim 5 wherein the insulating plates are formed of ceramic material.

11. A flowmeter as set forth in claim 5 wherein said elements are piezoelectric crystals.

* * * * *

UNITED STATES PATENT OFFICE
CERTIFICATE OF CORRECTION

PATENT NO. : 4,262,544
DATED : April 21, 1981
INVENTOR(S) : Peter J. Herzl

It is certified that error appears in the above-identified patent and that said Letters Patent are hereby corrected as shown below:

Column 2, line 3 "a" second occurrence should read -- as --

Column 2, line 27 "of" first occurrence should read -- or --.

Column 4, line 26 "form of Karman" should read
  -- form of a Karman --

Column 7, line 6 "parllel" should read -- parallel --

Column 7, line 57 "oppisite" should read -- opposite --

Column 8, line 28 "bieng" should read -- being --

Column 8, line 31 "proportinal" should read -- proportional --

Column 10, line 13, "parllel" should read -- parallel --

Signed and Sealed this

First Day of September 1981

[SEAL]

Attest:

Attesting Officer

GERALD J. MOSSINGHOFF

Commissioner of Patents and Trademarks